(12) United States Patent
Sugiyama

(10) Patent No.: US 8,244,075 B2
(45) Date of Patent: Aug. 14, 2012

(54) OPTICAL DEVICE

(75) Inventor: Masaki Sugiyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 278 days.

(21) Appl. No.: 12/837,765

(22) Filed: Jul. 16, 2010

(65) Prior Publication Data

US 2011/0019956 A1 Jan. 27, 2011

(30) Foreign Application Priority Data

Jul. 27, 2009 (JP) ................. 2009-173922

(51) Int. Cl.
*G02F 1/035* (2006.01)
(52) U.S. Cl. ............................. 385/2; 385/3
(58) Field of Classification Search .................. None
See application file for complete search history.

(56) References Cited

U.S. PATENT DOCUMENTS

| 5,488,677 A * | 1/1996 | Tokano .............................. 385/3 |
| 7,245,787 B2 | 7/2007 | Kawanishi et al. |
| 2005/0213863 A1 * | 9/2005 | Sugiyama et al. ................. 385/2 |
| 2007/0024949 A1 * | 2/2007 | Kim et al. ....................... 359/276 |

FOREIGN PATENT DOCUMENTS

JP 2005-265959 A 9/2005

* cited by examiner

*Primary Examiner* — Hemang Sanghavi
(74) *Attorney, Agent, or Firm* — Fujitsu Patent Center

(57) ABSTRACT

There is provided an optical device including a substrate having an electro-optical effect, a plurality of optical modulators including bias electrodes to which a bias voltage is applied so as to generate an electric field from one of the bias electrodes to another of the bias electrodes, and the bias electrodes of the optical modulators being disposed above the substrate, and a partition conductor to reduce influence of the electric field from the bias electrode of a first optical modulator to an optical waveguide of a second optical modulator, the partition conductor being disposed above the substrate.

20 Claims, 15 Drawing Sheets

OPTICAL DEVICE

CROSS-REFERENCE TO RELATED APPLICATION

This application is based upon and claims the benefit of priority of the prior Japanese Patent Application No. 2009-173922, filed on Jul. 27, 2009, the entire contents of which are incorporated herein by reference.

FIELD

The embodiments discussed herein are related to an optical device for optical communication.

BACKGROUND

In order to produce an optical waveguide device using a substrate made of an electro-optic crystal, such as $LiNbO_3$ (LN) or $LiTaO_2$, a metal film, such as a Ti film, is formed on part of the substrate and the metal is thermally diffused, or such a film is patterned and then subjected to proton exchange with benzoic acid. Subsequently, an electrode is formed in the vicinity of the optical waveguide to complete the optical waveguide device.

For example, a Mach-Zehnder optical modulator is used which includes an incident side waveguide, a pair of waveguides and an emission side waveguide in a photoelectric optical substrate, and coplanar RF (radio frequency) and ground electrodes over the parallel waveguides (for example, Japanese Laid-open Patent Publication No. 2005-265959). The operating point voltage, at which the optical output is turned off, of the Mach-Zehnder optical modulator, is varied depending on environmental temperature and other factors.

Accordingly, the Mach-Zehnder optical modulator is provided with a bias electrode in addition to the RF electrode for applying radio frequency signals. Output light is monitored while a low-frequency bias voltage is applied to the bias electrode so as to keep the operating point voltage constant, and thus the bias voltage is controlled according to the intensity of the output light. A variety of methods, such as multi-level modulation and polarization multiplexing, have been applied for optical modulation through the years. Accordingly, there are increasing cases of using a plurality of optical modulators. When a plurality of optical modulators are used, the optical modulators may be integrated on a substrate to reduce the size of the optical device.

SUMMARY

According to an aspect of the embodiment, there is provided an optical device including a substrate having an electro-optical effect, a plurality of optical modulators including bias electrodes to which a bias voltage is applied so as to generate an electric field from one of the bias electrodes to another of the bias electrodes, and the optical modulators being disposed above the substrate, and a partition conductor to reduce influence of the electric field from the bias electrode of a first optical modulator to an optical waveguide of a second optical modulator, the partition conductor being disposed above the substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The optical modulators on one substrate are disposed in such a manner that the bias electrode of each optical modulator is close to the other, and the optical waveguides of the optical modulators are undesirably affected by an electric field indicated by lines of electric force from the bias electrode of other optical modulators. Consequently, the optical modulators may be destabilized by each other. For example, a structure in which the bias electrodes of each optical modulator are disposed close to the bias electrodes of the other causes interference among the bias electrodes to destabilize the operating point voltages of the optical modulators.

If a frequency or a voltage not causing large interference among the bias electrodes is used, the optical modulator may not be designed as desired. If the distance between the bias electrodes are increased to reduce the interference among the bias electrodes, the width of the substrate is undesirably increased. Accordingly, the size of the optical device is increased and the number of chips produced from a wafer is reduced. This increases manufacturing cost. Other approaches of forming grooves in the rear surface of the substrate or forming grooves between the optical modulators may increase the number of process steps or reduce the structural strength of the substrate.

Accordingly, an object of the following embodiments is to provide an optical device and an optical transmitter that overcome the above disadvantage and increase the modulation accuracy.

Preferred embodiments of the disclosed optical device and optical transmitter will now be described in detail with reference to the drawings.

First Embodiment

Figure 1:
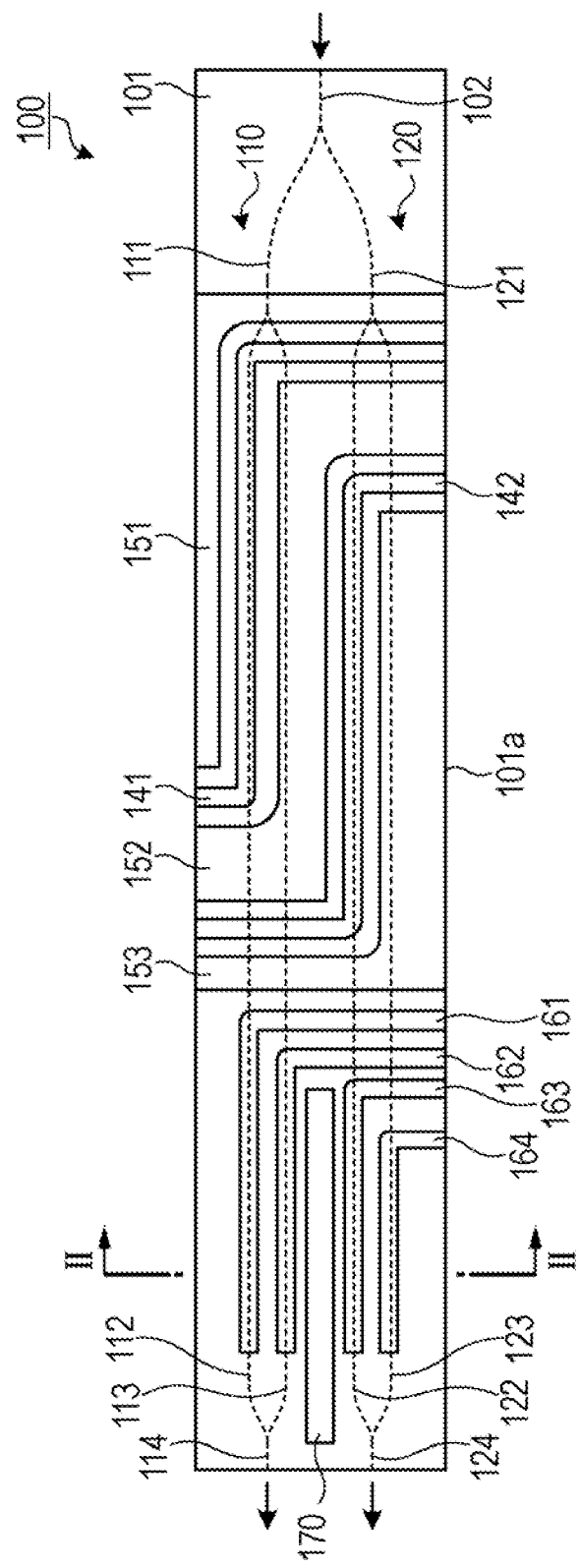
FIG. 1 is a diagram illustrating a plan view of the structure of an optical device according to a first embodiment.

FIG. 1 is a plan view of the structure of an optical device according to a first embodiment. As illustrated in FIG. 1, the optical device 100 of the first embodiment includes a substrate 101, a first Mach-Zehnder optical modulator 110, a second Mach-Zehnder optical modulator 120, and a partition electrode 170. The Mach-Zehnder optical modulators 110 and 120 are disposed in parallel above the substrate 101, and each includes a signal electrode to which signals are applied and bias electrodes to which a bias voltage is applied. The signal electrode and the bias electrodes are disposed close to the optical waveguide of the Mach-Zehnder optical modulator.

The substrate 101 is made of an electro-optic ferroelectric material, such as $LiNbO_3$ or $LiTaO_2$. A branched optical waveguide 102 and optical waveguides of the first and second Mach-Zehnder optical modulators 110 and 120 are formed in the substrate 101, as indicated by dotted lines. The branched optical waveguide 102 allows the entering light to diverge toward the Mach-Zehnder optical modulators 110 and 120.

The first Mach-Zehnder optical modulator 110 has an incident side waveguide 111, a pair of waveguides 112 and 113, and an emission side waveguide 114. Light coming from the branched optical waveguide 102 enters the incident side waveguide 111 and diverges to the parallel waveguides 112 and 113. Fluxes of light from the parallel waveguides 112 and 113 are multiplexed and go out from the emission side waveguide 114.

The second Mach-Zehnder optical modulator 120 has an incident side waveguide 121, a pair of waveguides 122 and 123, and an emission side waveguide 124. Light coming from the branched optical waveguide 102 enters the incident side waveguide 121 and diverges to the parallel waveguides 122 and 123. Fluxes of light from the parallel waveguides 122 and 123 are multiplexed and go out from the emission side waveguide 124.

The signal electrode 141 of the first Mach-Zehnder optical modulator 110 is formed on the substrate 101 along part (right part in the figure) of the parallel waveguide 112. The signal electrode 142 of the second Mach-Zehnder optical modulator 120 is formed on the substrate 101 along part (right part in the figure) of the parallel waveguide 122. Both ends of the signal electrodes 141 and 142 reach the edge of the substrate 101. For example, one ends of the signal electrodes 141 and 142 reach a side 101a of the substrate 101.

Ground electrodes 151 and 152 are disposed with the signal electrode 141 of the first Mach-Zehnder optical modulator 110 therebetween on the substrate 101 in such a manner that gaps are formed between the signal electrode 141 and the ground electrodes 151 and 152. The ground electrodes 151 and 152 have larger widths than the signal electrode 141. The ground electrodes 151 and 152 have a sandwich structure with the signal electrode 141, and the signal electrode 141 and the ground electrodes 151 and 152 define a coplanar electrode.

A ground electrode 153 is formed. The ground electrode 152 and 153 are disposed with the signal electrode 142 of the second Mach-Zehnder optical modulator 120 therebetween on the substrate 101 in such a manner that gaps are formed between the signal electrode 142 and the ground electrodes 152 and 153. The ground electrodes 152 and 153 have larger widths than the signal electrode 142. The ground electrodes 152 and 153 have a sandwich structure with the signal electrode 142, and the signal electrode 142 and the ground electrodes 153 and 152 define a coplanar electrode.

A Z-cut substrate may be used as the substrate 101. In this instance, since the refractive index is efficiently varied by the electric field in the Z direction, the signal electrode 141 of the first Mach-Zehnder optical modulator 110 and the ground electrode 152 may be respectively disposed over the parallel waveguides 112 and 113 of the first Mach-Zehnder optical modulator 110. Similarly, the signal electrode 142 of the second Mach-Zehnder optical modulator 120 and the ground electrode 153 may be respectively disposed over the parallel waveguides 122 and 123 of the second Mach-Zehnder optical modulator 120.

By applying an RF signal to the signal electrode 141 of the first Mach-Zehnder optical modulator 110, the phase of light transmitted through the parallel waveguide 112 of the first Mach-Zehnder optical modulator 110 is changed, so that the light to be emitted from the first Mach-Zehnder optical modulator 110 may be modulated. Similarly, by applying an RF signal to the signal electrode 142 of the second Mach-Zehnder optical modulator 120, the phase of light transmitted through the parallel waveguide 122 of the second Mach-Zehnder optical modulator 120 is changed, so that the light to be emitted from the second Mach-Zehnder optical modulator 120 may be modulated.

Bias electrodes 161 to 164 are disposed above the substrate 101 apart from the signal electrodes 141 and 142 and the ground electrodes 151 to 153. The bias electrode 161 is a bias electrode for pushing a bias voltage (push electrode) and is formed along part (left part in the figure) of the parallel waveguide 112 of the first Mach-Zehnder optical modulator 110. The bias electrode 162 is a bias electrode for pulling the bias voltage (pull electrode) and is formed along part (left part in the figure) of the parallel waveguide 113 of the first Mach-Zehnder optical modulator 110. Symmetrical positive and negative direct current (DC) bias voltages are applied to the bias electrodes 161 and 162.

The bias electrode 163 is the push electrode and is formed along part (left part in the figure) of the parallel waveguide 122 of the second Mach-Zehnder optical modulator 120. The bias electrode 164 is the pull electrode and is formed along part (left part in the figure) of the parallel waveguide 123 of the second Mach-Zehnder optical modulator 120. Symmetrical positive and negative DC bias voltages are applied to the bias electrodes 163 and 164.

The partition electrode 170 alleviates the effect of an electric field indicated by lines of electric force from the bias electrodes of each Mach-Zehnder optical modulator 110 and 120 on the optical waveguide of the other Mach-Zehnder optical modulator. More specifically, the partition electrode 170 is disposed above the substrate 101 between the bias electrodes 161 and 162 of the first Mach-Zehnder optical modulator 110 and the bias electrodes 163 and 164 of the second Mach-Zehnder optical modulator 120.

The partition electrode 170 is separated from the bias electrode 162 and 163 with spaces to prevent a short circuit with the bias electrodes 162 and 163. The partition electrode 170 separates the bias electrodes of the first Mach-Zehnder optical modulator 110 and the bias electrodes of the second Mach-Zehnder optical modulator 120.

Thus, the electric field indicated by lines of electric force from the bias electrodes 161 and 162 of the first Mach-Zehnder optical modulator 110 to the bias electrodes 163 and 164 of the second Mach-Zehnder optical modulator 120 is absorbed by the partition electrode 170. Consequently, the changes in electric field of the pair of waveguides 122 and 123 of the second Mach-Zehnder optical modulator 120 may be reduced which is caused by the bias electrodes 161 and 162 of the first Mach-Zehnder optical modulator 110. Similarly, the electric field indicated by lines of electric force from the bias electrodes 163 and 164 of the second Mach-Zehnder optical modulator 120 to the bias electrodes 161 and 162 of the first Mach-Zehnder optical modulator 110 are absorbed by the partition electrode 170. Consequently, the changes in electric field of the pair of waveguides 112 and 113 of the first Mach-Zehnder optical modulator 110 may be reduced which is caused by the bias electrodes 163 and 164 of the second Mach-Zehnder optical modulator 120.

An optically transparent buffer layer may be formed on one surface of the substrate 101. The buffer layer is disposed between the substrate 101 and the electrodes including the signal electrodes 141 and 142, the ground electrodes 151 to 153, the bias electrodes 161 to 164 and the partition electrode 170. Such a buffer layer prevents optical loss caused by the electrodes absorbing light passing through the parallel waveguides 112, 113, 122 and 123 in the substrate 101. For example, a 0.21 μm thick $SiO_2$ film may be used as the buffer layer.

In the above structure, light entering from the branched optical waveguide 102 diverges to the Mach-Zehnder optical modulators 110 and 120. However, the branched optical waveguide 102 may be omitted so that external light directly enters the Mach-Zehnder optical modulators 110 and 120.

Figure 2:
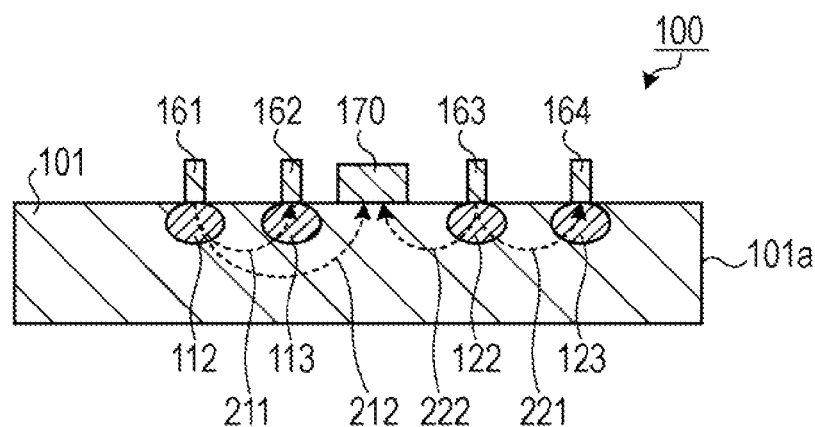
FIG. 2 is a diagram illustrating a sectional view taken along line II-II in FIG. 1.

FIG. 2 is a sectional view taken along line II-II in FIG. 1. When symmetrical positive and negative DC bias voltages are applied to the bias electrodes 161 and 162 of the first Mach-Zehnder optical modulator 110, an electric field indicated by lines of electric force 211 is produced from the bias electrode 161 to the bias electrode 162. Thus the electric field indicated by lines of electric force 211 changes the refractive index of the parallel waveguides 112 and 113. Consequently, the phase of the light propagating through the parallel waveguides 112 and 113 is changed.

Similarly, when symmetrical positive and negative DC bias voltages are applied to the bias electrodes 163 and 164 of the second Mach-Zehnder optical modulator 120, an electric field indicated by lines of electric force 221 is produced from the bias electrode 163 to the bias electrode 164. Thus the electric field indicated by lines of electric force 221 changes the refractive index of the parallel waveguides 122 and 123. Consequently, the phase of the light propagating through the parallel waveguides 122 and 123 is changed.

An electric field indicated by lines of electric force 212 from the bias electrode 161 toward the parallel waveguides 122 and 123 beyond the bias electrode 162 is absorbed by the partition electrode 170. Consequently, the effect of the electric field indicated by lines of electric force 212 on the parallel waveguides 122 and 123 may be reduced. Also, the electric field indicated by lines of electric force 222 from the bias electrode 163 toward the parallel waveguides 112 and 113 are absorbed by the partition electrode 170. Consequently, the effect of the electric field indicated by lines of electric force 222 on the parallel waveguides 112 and 113 may be reduced.

Figure 3:
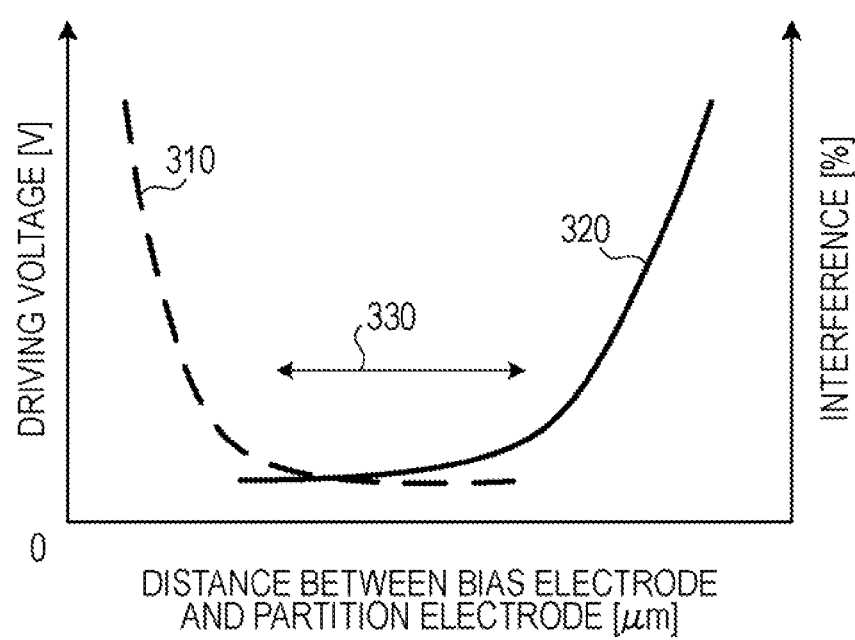
FIG. 3 is a diagram plotting the relationships between properties of the optical device and the distance from the bias electrode to the partition electrode.

FIG. 3 is a diagram plotting the relationships between properties of the optical device and the distance from the bias electrode to the partition electrode. In FIG. 3, the horizontal axis represents the distance (μm) from one of the bias electrodes (for example, 162 or 163) to the partition electrode 170. The left vertical axis represents the driving voltage (V) of the bias electrode for controlling the operating point voltage. The right vertical axis represents the interference (%) between the bias electrodes.

One curve designated by reference number 310 indicates the relationship between the distance (horizontal axis) from the bias electrode to the partition electrode 170 and the driving voltage (left axis) of the bias electrode. The other curve designated by reference number 320 indicates the relationship between the distance (horizontal axis) from the bias electrode to the partition electrode 170 and the interference (right axis) between the bias electrodes.

The former curve 310 indicates that as the partition electrode 170 becomes closer to the bias electrodes, the driving voltage of the bias electrode for controlling the operating point voltage is increased. This is because as the partition electrode 170 becomes closer to the bias electrode, the partition electrode 170 absorbs more electric field indicated by lines of electric force to reduce the efficiency of electric field applied to the waveguides from the bias electrode.

On the other hand, the latter curve 320 indicates that as the partition electrode 170 becomes farther from the bias electrodes, the interference between the bias electrodes is increased. This is because as the partition electrode 170 becomes farther from the bias electrodes, the absorption of the electric field indicated by lines of electric force by the partition electrode 170 is reduced. Consequently, the electric field indicated by lines of electric force from the bias electrodes of each Mach-Zehnder optical modulator are applied to the bias electrodes of the other Mach-Zehnder optical modulator.

As described above, the partition electrode 170 and the bias electrodes have a trade-off relationship where the driving voltage is increased as the distances between the bias electrodes and the partition electrode 170 are reduced, while the interference between the bias electrodes is increased as the distances between the bias electrodes and the partition electrode 170 are increased. However there is a range 330 in which the interference is reduced without increasing the driving voltage. In the optical device 100 of the present embodiment, the distances between the bias electrodes and the partition electrode 170 are set in this range.

The optical device 100 of the first embodiment has the partition electrode 170 between the bias electrodes of the first Mach-Zehnder optical modulator 110 and the bias electrodes of the second Mach-Zehnder optical modulator 120. The structure of the first embodiment may reduce the effect of electric field indicated by lines of electric force from the bias electrodes of each Mach-Zehnder optical modulator 110 and 120 on the other Mach-Zehnder optical modulator. Thus, the modulation accuracy of the Mach-Zehnder optical modulators 110 and 120 may be increased. In addition, the interference between the bias electrodes 161 and 162 of the first Mach-Zehnder optical modulators 110 and the bias electrodes 163 and 164 of the second Mach-Zehnder optical modulators 120 may be reduced. Accordingly, the Mach-Zehnder optical modulators 110 and 120 may accurately control the operating point voltage.

Second Embodiment

Figure 4:
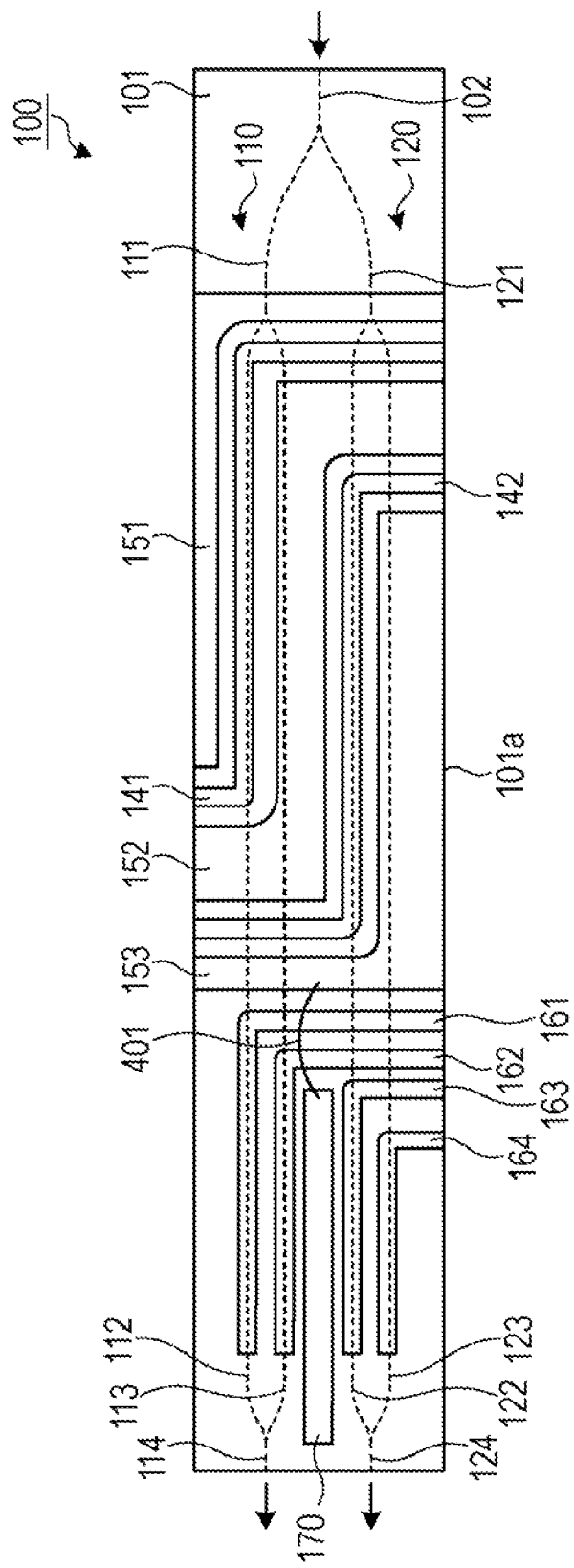
FIG. 4 is a diagram illustrating a plan view of the structure of an optical device according to a second embodiment.

FIG. 4 is a plan view of the structure of an optical device according to a second embodiment. In FIG. 4, the same parts as in FIG. 1 are designated by the same reference numerals, and the same description will be omitted. As illustrated in FIG. 4, the partition electrode 170 of the optical device 100 according to the second embodiment is connected to the ground electrode 153 with a wire 401 by wire bonding.

Accordingly, the partition electrode 170 is grounded by grounding the ground electrode 153. This means that the process step of directly grounding the partition electrode 170 may be omitted to reduce installation cost. In addition, by grounding the ground electrode 153, the interference between the bias electrodes 161 and 162 of the first Mach-Zehnder optical modulator 110 and the bias electrodes 163 and 164 of the second Mach-Zehnder optical modulator 120 may be efficiently reduced.

Figure 5:
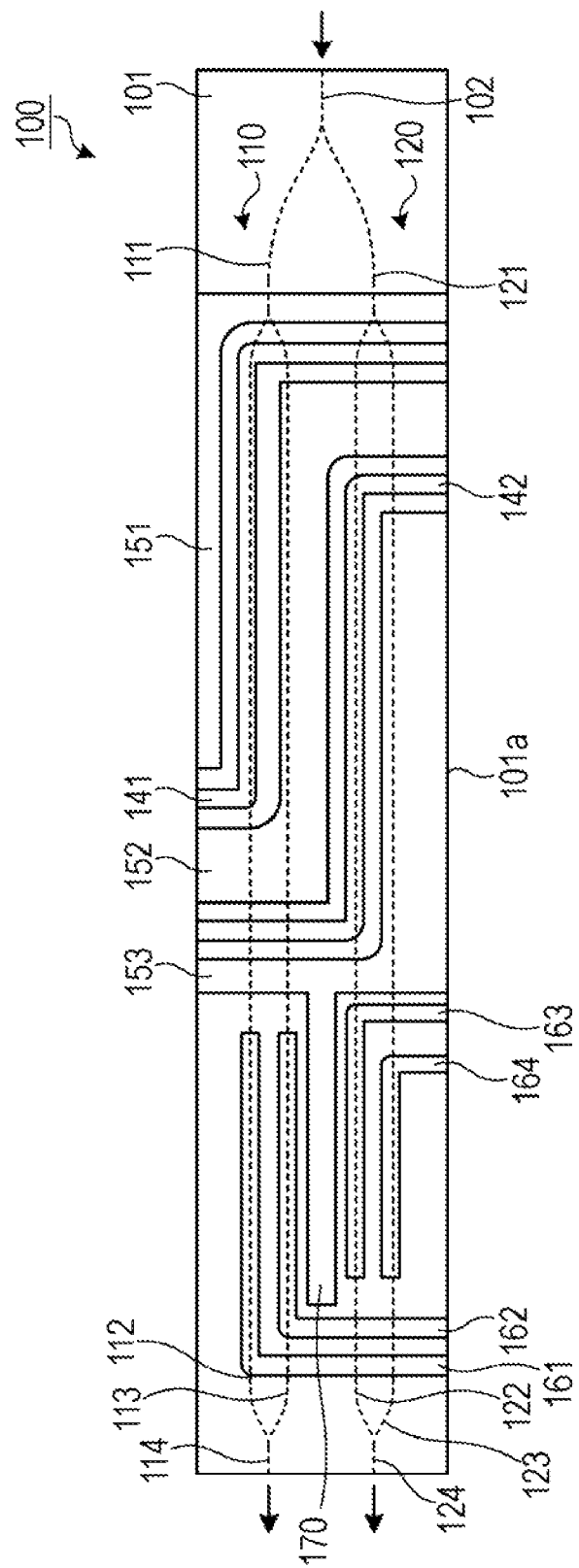
FIG. 5 is a diagram illustrating a plan view of a first modification of the optical device according to the second embodiment.

FIG. 5 is a plan view of a first modification of the optical device according to the second embodiment. In FIG. 5, the same parts as in FIG. 1 are designated by the same reference numerals, and the same description will be omitted. In the first modification of the optical device 100, the partition electrode 170 is formed by patterning so as to connect the ground electrode 153, as illustrated in FIG. 5. By forming the partition electrode 170 simultaneously with the ground electrode by patterning, wire bonding is not required, and accordingly installation cost may be reduced.

The bias electrodes 161 and 162 of the first Mach-Zehnder optical modulator 110 are arranged in such a manner that their one ends of the two ends farther from the ground electrode 153 reach the side 101a of the substrate 101. Thus, the bias electrodes 161 to 164 are extended to the side 101a of the substrate 101 to facilitate the wiring of the bias electrodes 161 to 164. In addition, this structure allows the partition electrode 170 to be connected more easily to the ground electrode 153 than the structure in which the ends closer to the ground electrode 153 of the bias electrodes 161 and 162 reach the side 101a of the substrate 101 as illustrated in FIG. 1.

Thus, the ends farther from the ground electrode 153 of the bias electrodes 161 and 162 of the first Mach-Zehnder optical modulator 110, which is located farther from the side 101a of the substrate 101 than the other Mach-Zehnder optical modulator, reach the side 101a of the substrate 101. This structure facilitates the wiring of the bias electrodes 161 to 164 and allows the partition electrode 170 to be connected easily to the ground electrode 153.

Figure 6:
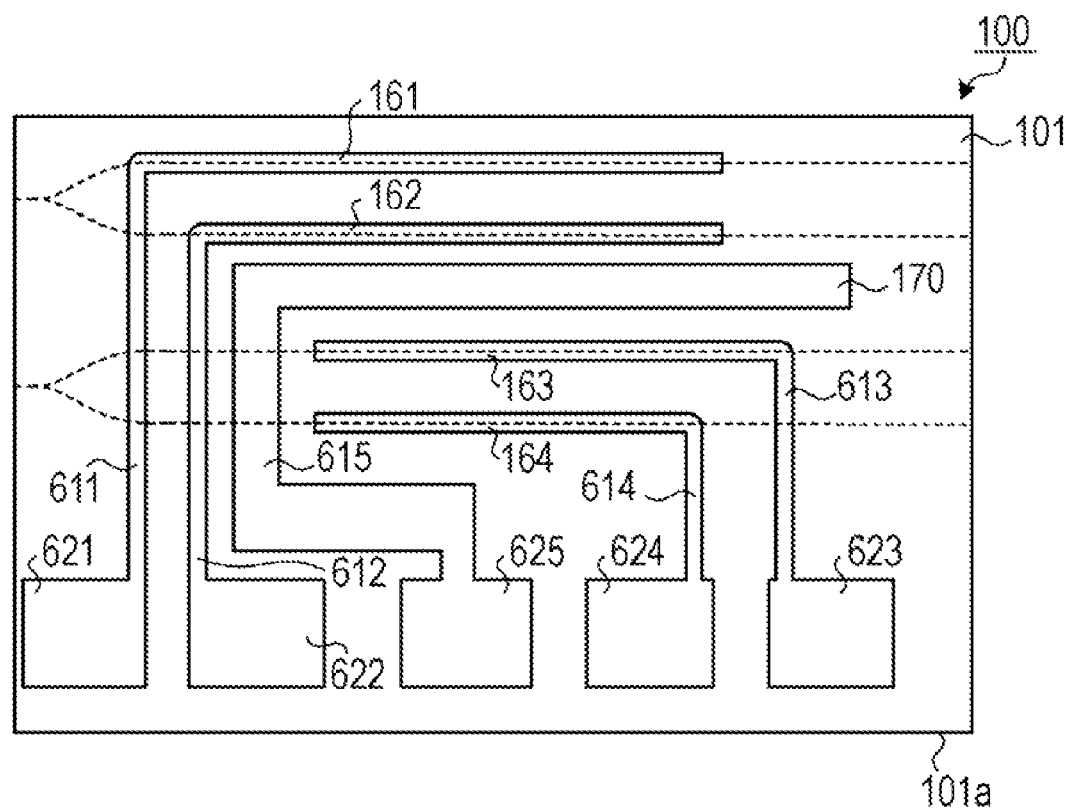
FIG. 6 is a diagram illustrating a plan view of a second modification of the optical device according to the second embodiment.

FIG. 6 is a fragmentary enlarged plan view of a second modification of the optical device according to the second embodiment. In FIG. 6, the same parts as in FIG. 1 are designated by the same reference numerals, and the same description will be omitted. FIG. 6 illustrates the bias electrodes 161 to 164 and their vicinities in an enlarged view, and other parts of the optical device 100, not illustrated in FIG. 6, have the same structures as in FIG. 1.

As illustrated in FIG. 6, electrode pads 621 to 624 are provided along the side 101a of the substrate 101 parallel to the Mach-Zehnder optical modulators 110 and 120. The electrode pads 621 to 624 are connected to the bias electrodes 161 to 164 with feed parts 611 to 614, respectively. By connecting the electrode pads 621 to 624 to the outside by, for example, wire bonding, the bias electrodes 161 to 164 are electrically connected to the outside.

A partition electrode pad 625 is also provided close to the side 101a of the substrate 101 and to which the partition electrode 170 is connected with a feed part 615. By connecting the partition electrode pad 625 to the outside by, for example, wire bonding, the partition electrode 170 is grounded.

The partition electrode 170 has the feed part 615 extending between the feed parts 611 and 612 of the first Mach-Zehnder optical modulator 110 and the feed parts 613 and 614 of the second Mach-Zehnder optical modulator 120. Consequently, the partition electrode 170 may reduce the interference between the feed parts 611 and 612 and the feed parts 613 and 614. Furthermore, the partition electrode 170 is extended to the position between the electrode pads 621 and 622 of the first optical modulator 110 and the electrode pads 623 and 624 of the second optical modulator 120 by the partition electrode pad 625. Consequently, the partition electrode 170 may reduce the interference between the electrode pads 621 and 622 and the electrodes pads 623 and 624.

The partition electrode pad 625 has substantially the same size as the electrode pads 621 to 624 of the optical modulators 110 and 120. Accordingly, the partition electrode pad 625 is formed simultaneously with the electrode pads 621 to 624 of the optical modulators 110 and 120. Also, the wire bonding of the partition electrode pad 625 is readily performed in the same step as the wire bonding of the electrode pads 621 to 624. Thus, the manufacturing efficiency may be enhanced.

The partition electrode pad 625 and the electrode pads 621 to 624 are disposed at substantially regular intervals. Accordingly, the partition electrode pad 625 is formed simultaneously with the electrode pads 621 to 624 of the optical modulators 110 and 120. Also, the wire bonding of the partition electrode pad 625 is readily performed in the same step as the wire bonding of the electrode pads 621 to 624. Thus, the manufacturing efficiency may be enhanced.

Figure 7:
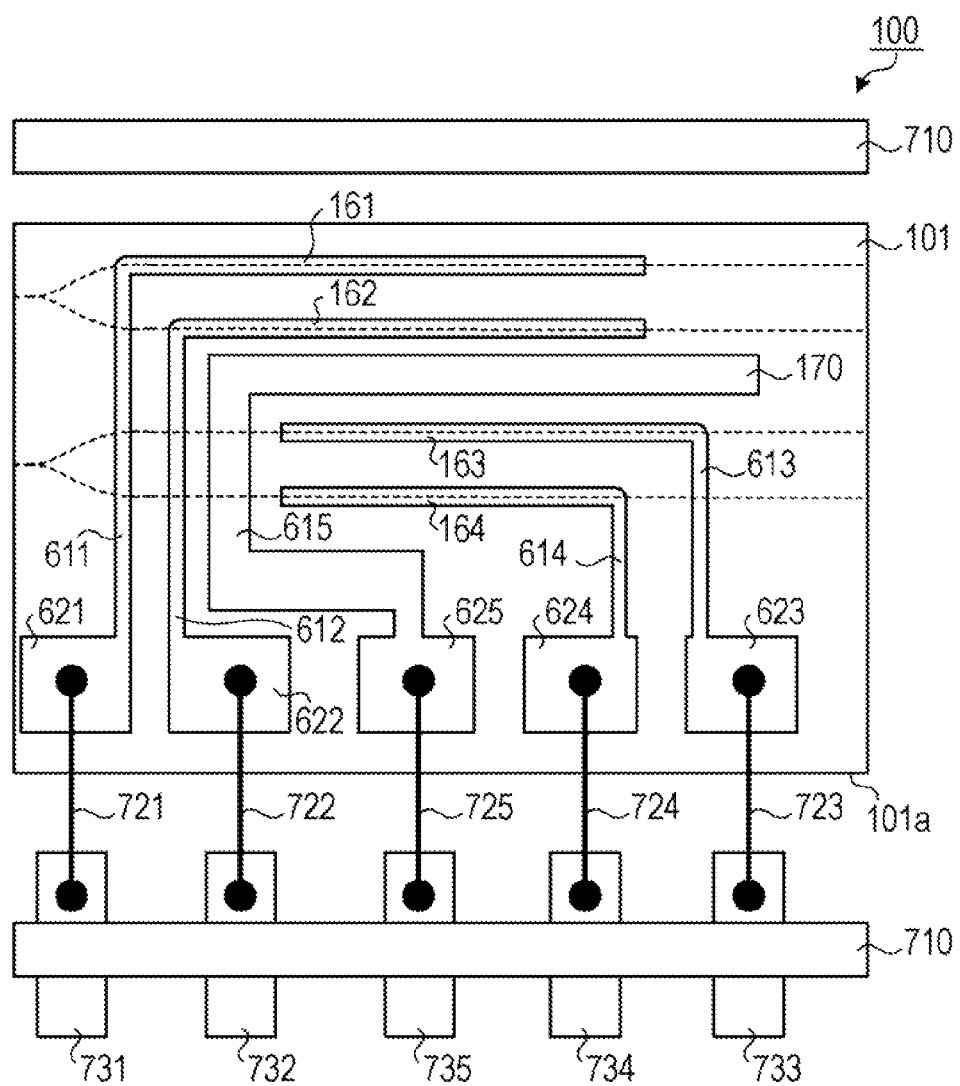
FIG. 7 is a diagram illustrating a plan view of a third modification of the optical device according to the second embodiment.

FIG. 7 is a fragmentary plan view of a third modification of the optical device according to the second embodiment. In FIG. 7, the same parts as in FIG. 6 are designated by the same reference numerals, and the same description will be omitted. As illustrated in FIG. 7, the optical device 100 according to the third modification of the second embodiment has an enclosure 710 containing the substrate 101. The enclosure 710 has pins 731 to 735.

The pins 731 to 735 are electrodes extending from the inside of the enclosure 710 to the outside. One electrode pad 621 is connected to the portion of the pin 731 located within the enclosure 710 with a wire 721. Similarly, the other electrode pads 622 to 624 are connected to the pins 732 to 734 with wires 722 to 724, respectively.

The partition electrode pad 625 is connected to the portion of the pin 735 located within the enclosure 710 with a wire 725. The partition electrode 170 and the portion of the pin 735 located within the enclosure 710 are electrically connected to each other. By grounding the portion of the pin 735 outside the enclosure 710, the partition electrode 170 is readily grounded.

In the second embodiment and its modifications, the partition electrode 170 is grounded so as to reduce the effect of the electric field indicated by lines of electric force from the bias electrodes of each Mach-Zehnder optical modulator 110 and 120 on the other Mach-Zehnder optical modulator. Thus, the modulation accuracy of the Mach-Zehnder optical modulators 110 and 120 may be increased. In addition, the interference between the bias electrodes 161 and 162 of the firs optical modulator 110 and the bias electrodes 163 and 164 of the second optical modulator 120 may be more efficiently reduced. Accordingly, the Mach-Zehnder optical modulators 110 and 120 may accurately control the operating point voltage.

Third Embodiment

Figure 8:
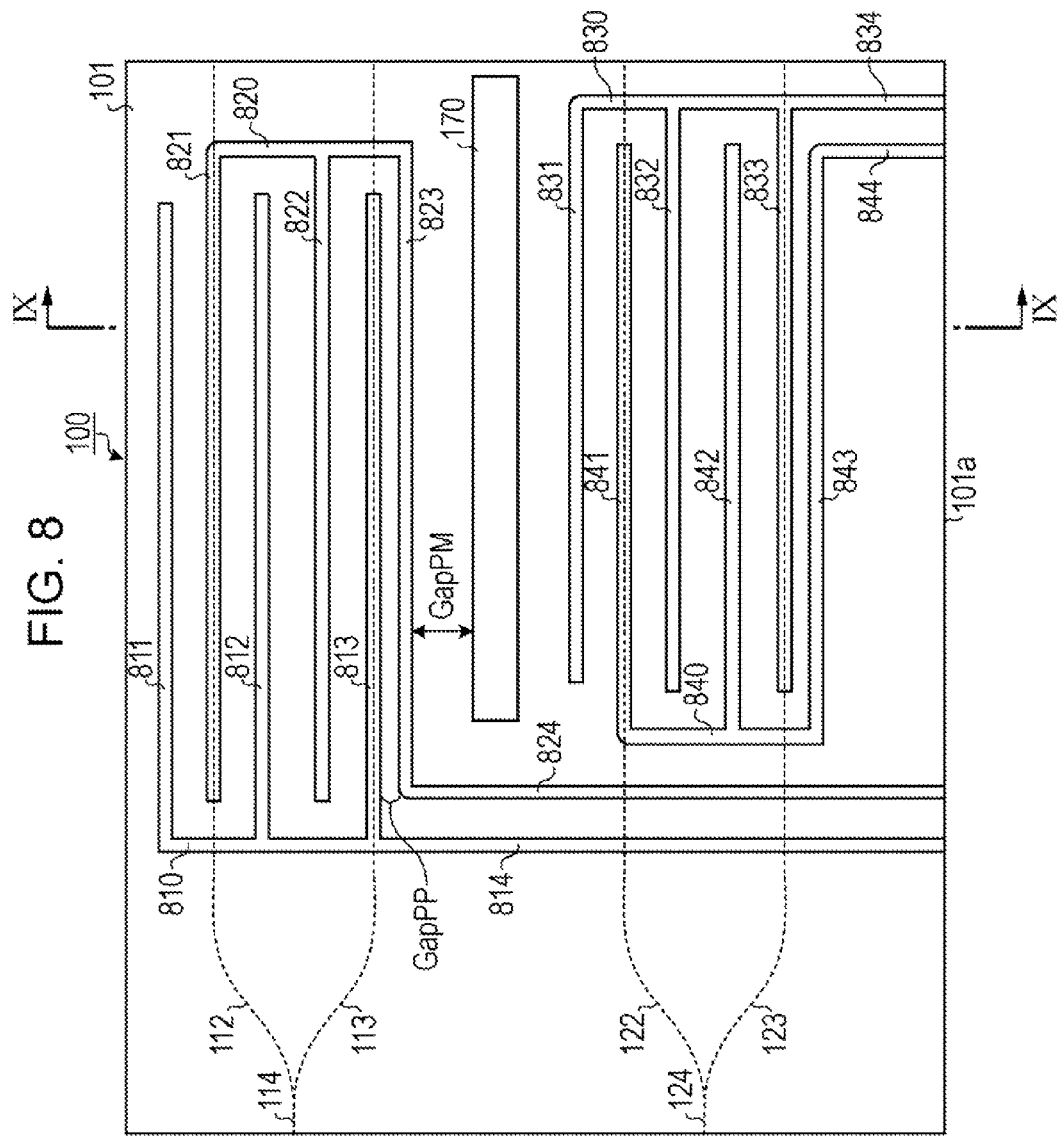
FIG. 8 is a diagram illustrating a plan view of the structure of an optical device according to a third embodiment.
Figure 9:
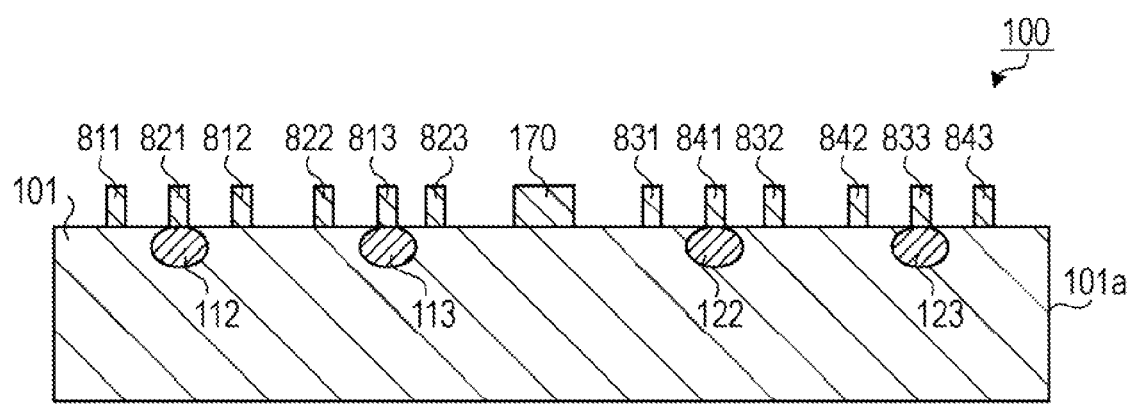
FIG. 9 is a diagram illustrating a sectional view taken along line IX-IX in FIG. 8.

FIG. 8 is a fragmentary plan view of the structure of an optical device according to a third embodiment. FIG. 9 is a sectional view taken along line IX-IX in FIG. 8. FIG. 8 illustrates the bias electrodes 161 to 164 and their vicinities in an enlarged view, and other parts of the optical device 100, not illustrated in FIG. 8, have the same structures as in FIG. 1. As illustrated in FIG. 8, the optical device 100 according to the third embodiment includes bias electrodes 810, 820, 830 and 840 instead of the bias electrodes 161 to 164 illustrated in FIG. 1.

The bias electrode 810 is a bias electrode for pushing the bias voltage (push electrode) disposed above the substrate 101. The bias electrode 810 has a comb-like shape having parallel conductors 811 to 813. The parallel conductor 813 extends along the parallel waveguide 113 of the first optical modulator. The bias electrode 810 has a feed part 814 extending to the side 101a of the substrate 101.

The bias electrode 820 is a bias electrode for pulling the bias voltage (pull electrode) disposed above the substrate 101. The bias electrode 820 has a comb-like shape having parallel conductors 821 to 823. The parallel conductor 821 extends along the parallel waveguide 112 of the first optical modulator. The bias electrode 820 has a feed part 824 extending to the side 101a of the substrate 101. The bias electrodes 810 and 820 of the first optical modulator are arranged in such a manner that the parallel conductors 811 to 813 of the push electrode 810 and the parallel conductors 821 to 823 of the pull electrode 820 are alternately disposed with intervals.

The bias electrode 830 is a bias electrode for pushing the bias voltage (push electrode) disposed above the substrate 101. The bias electrode 830 has a comb-like shape having parallel conductors 831 to 833. The parallel conductor 833 extends along the parallel waveguide 123 of the second optical modulator. The bias electrode 830 has a feed part 834 extending to the side 101a of the substrate 101.

The bias electrode 840 is a bias electrode for pulling the bias voltage (pull electrode) disposed above the substrate 101. The bias electrode 840 has a comb-like shape having parallel conductors 841 to 843. The parallel conductor 841 extends along the parallel waveguide 122 of the second optical modulator. The bias electrode 840 has a feed part 844 extending to the side 101a of the substrate 101. The bias electrodes 830 and 840 are arranged in such a manner that the parallel conductors 831 to 833 of the push electrode 830 and the parallel conductors 841 to 843 of the pull electrodes 840 are alternately disposed with intervals.

As described above, the Mach-Zehnder optical modulators 110 and 120 may each have three push parallel conductors and three pull parallel conductors. This structure enhances the efficiency of electric field applied from the bias electrodes 810 and 820 to reduce the driving voltage. In this structure, the bias electrodes 810 and 820 of the first optical modulator and the bias electrodes 830 and 840 of the second optical modulator are separated by a partition electrode 170. The partition electrode 170 may reduce the interference between the bias electrodes 810 and 820 of the first optical modulator and the bias electrodes 830 and 840 of the second optical modulator.

If the distances between the partition electrode 170 and the bias electrodes are too small, the bias electrodes may not sufficiently apply an electric field to the waveguides. Accordingly, the partition electrode 170 is disposed so that distance GapPM between the bias electrode (for example, the parallel conductor 823 closest to the partition electrode 170) and the partition electrode 170 is larger than the distance GapPP between the push electrode and the pull electrode of the bias electrodes. The distance GapPP may be defined by the interval between the parallel conductor 813 and the parallel conductor 823.

In the structure in which the Mach-Zehnder optical modulators 110 and 120 each having three push parallel conductors and three pull parallel conductors, a partition electrode 170 having an excessively small width reduces the effect of reducing the interference. Accordingly, the partition electrode 170 is designed so that its width is larger than that of the bias electrodes. The width of the bias electrodes are defined as the width of the parallel conductors of the bias electrodes 810, 820, 830 and 840.

According to the optical device 100 of the third embodiment, in which three push parallel conductors and three pull parallel conductors are provided for each optical modulator, the same effect as in the first embodiment may be produced. The numbers of the push parallel conductors and the pull parallel conductors may be two or four. Such structures may produce the same effect as in the first embodiment.

Fourth Embodiment

Figure 10:
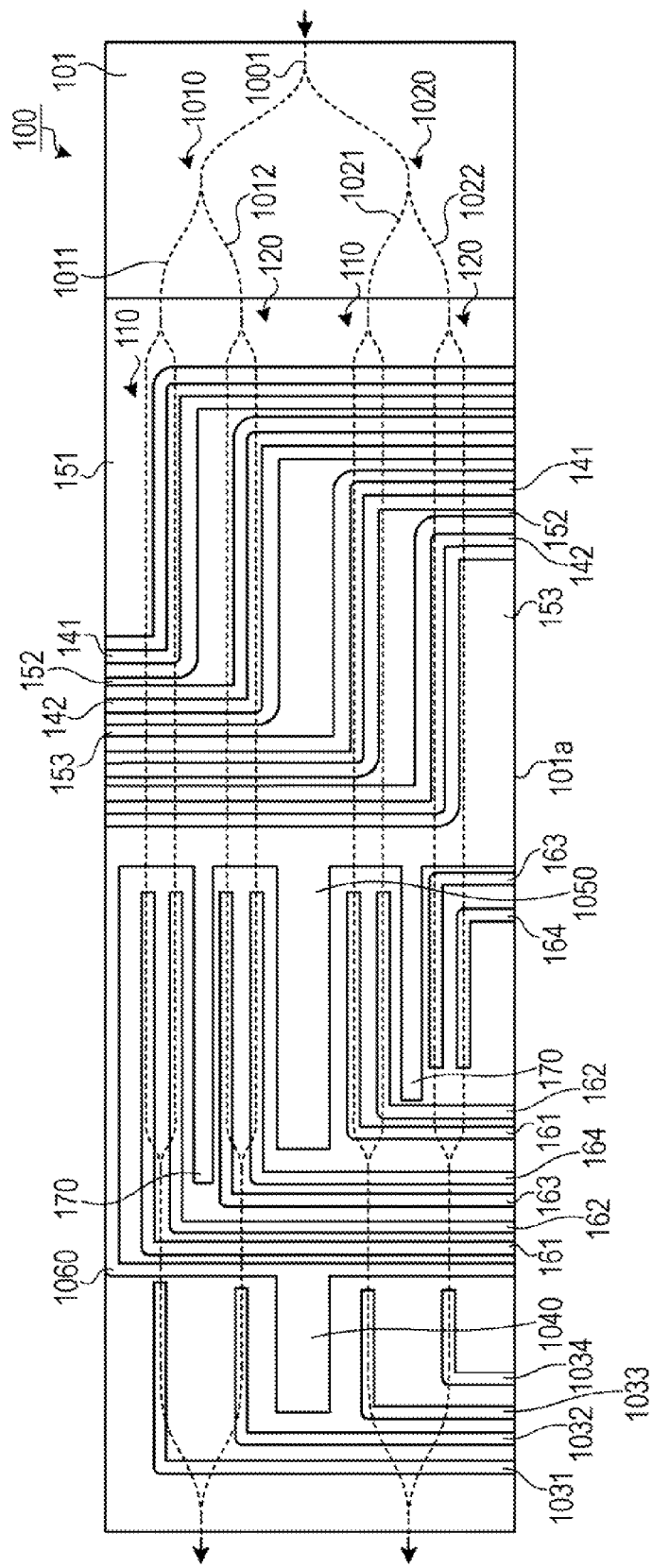
FIG. 10 is a diagram illustrating a plan view of the structure of an optical device according to a fourth embodiment.

FIG. 10 is a plan view of the structure of an optical device according to a fourth embodiment. In FIG. 10, the same parts as in FIG. 1 are designated by the same reference numerals, and the same description will be omitted. The optical device 100 of the fourth embodiment is a two-output differential quadrature phase shift keying (DQPSK) modulator used for polarization multiplexing.

As illustrated in FIG. 10, the optical device 100 of the fourth embodiment includes a substrate 101, a first Mach-Zehnder interferometer 1010, a second Mach-Zehnder interferometer 1020, and partition electrodes 1040, 1050 and 1060. A branched optical waveguide 1001 is provided in the substrate 101. The branched optical waveguide 1001 allows incident light to diverge toward the Mach-Zehnder interferometers 1010 and 1020.

The first and second Mach-Zehnder interferometers 1010 and 1020 are arranged in parallel in the substrate 101. The first and second Mach-Zehnder interferometers 1010 and 1020 each have Mach-Zehnder optical modulators 110 and 120, a partition electrode 170, and second bias electrodes producing an electric field indicated by lines of electric force provided for each optical waveguide.

More specifically, the first Mach-Zehnder interferometer 1010 includes a first pair of waveguides 1011 including the incident and emission side waveguides and a second pair of waveguides 1012 including the incident and emission side waveguides. The first Mach-Zehnder optical modulator 110 and a bias electrode 1031 are provided for the first pair of waveguides 1011; the second Mach-Zehnder optical modulator 120 and a bias electrode 1032 are provided for the second pair of waveguides 1012. The first Mach-Zehnder interferometer 1010 has a partition electrode (first partition electrode) 170 separating the bias electrodes 161 and 162 of the first Mach-Zehnder optical modulator 110 and the bias electrodes 163 and 164 of the second Mach-Zehnder optical modulator 120.

The second Mach-Zehnder interferometer 1020 has a first pair of waveguides 1021 including the incident and emission side waveguides and a second pair of waveguides 1022 including the incident and emission side waveguides. The first Mach-Zehnder optical modulator 110 and a bias electrode 1033 are provided for the first pair of waveguides 1021; the second Mach-Zehnder optical modulator 120 and a bias electrode 1034 are provided for the second pair of waveguides 1022. The second Mach-Zehnder interferometer 1020 has a partition electrode 170 separating the bias electrodes 161 and 162 of the first Mach-Zehnder optical modulator 110 and the bias electrodes 163 and 164 of the second Mach-Zehnder optical modulator 120.

The bias electrodes 1031 and 1032 of the first Mach-Zehnder interferometer 1010 and the bias electrodes 1033 and 1034 of the second Mach-Zehnder interferometer 1020 are separated by a second partition electrode 1040 (second partition conductor) on the substrate 101. The second partition electrode 1040 reduces the interference between the bias electrodes 1031 and 1032 of the first Mach-Zehnder interferometer 1010 and the bias electrodes 1033 and 1034 of the second Mach-Zehnder interferometer 1020.

The bias electrodes 161 to 164 of the first Mach-Zehnder interferometer 1010 and the bias electrodes 161 to 164 of the second Mach-Zehnder interferometer 1020 are separated by a third partition electrode 1050 (third partition conductor) on the substrate 101. The third partition electrode 1050 reduces the interference between the bias electrodes 161 to 164 of the Mach-Zehnder interferometer 1010 and the bias electrodes 161 to 164 of the Mach-Zehnder interferometer 1020.

The bias electrodes 161 to 164 of the first and second Mach-Zehnder optical modulators 110 and 120 and the bias electrodes 1031 to 1034 of the first and second Mach-Zehnder interferometers 1010 and 1020 are separated by a fourth partition electrode 1060 (fourth partition conductor) on the substrate 101. The fourth partition electrode 1060 reduces the interference between the bias electrodes 161 to 164 of the first and second Mach-Zehnder optical modulators 110 and 120 and the bias electrodes 1031 to 1034 of the first and second Mach-Zehnder interferometers 1010 and 1020.

The first partition electrode 170 separating the bias electrodes between the first and second Mach-Zehnder optical modulators 110 and 120 is connected to the second partition electrode 1040 separating the bias electrodes between the Mach-Zehnder interferometers 1010 and 1020 through the fourth partition electrode 1060 separating the bias electrodes between the Mach-Zehnder optical modulators and the Mach-Zehnder interferometers. Accordingly, the second partition electrode 1040 may be grounded by grounding the first partition electrode 170. This means that the process step of directly grounding the second partition electrode 1040 may be omitted to reduce installation cost. Since the second partition electrode 1040 is grounded, the interference between the bias electrodes 161 to 164 of the Mach-Zehnder optical modulators and the bias electrodes 1031 to 1034 of the Mach-Zehnder interferometers may be efficiently reduced.

The third partition electrode 1050 separating the bias electrodes 161 to 164 between the Mach-Zehnder interferometers 1010 and 1020 is connected to a ground electrode 153 with a patterned electrode. Thus, the third partition electrode 1050 may be grounded by grounding the ground electrode 153. This means that the process step of directly grounding the third partition electrode 1050 may be omitted to reduce installation cost. In addition, by grounding the third partition electrode 1050, the interference between the bias electrodes 161 to 164 of the first Mach-Zehnder interferometer 1010 and the bias electrodes 161 and 164 of the second Mach-Zehnder interferometer 1020 may be efficiently reduced.

As described above, the optical device 100 of the fourth embodiment has two Mach-Zehnder interferometers 1010 and 1020 and four sub-Mach-Zehnder interferometers (Mach-Zehnder optical modulators 110 and 120 for each Mach-Zehnder interferometer 1010 and 1020). In this optical device 100, the interference of the bias electrodes among the four sub-Mach-Zehnder interferometers may be reduced by the first and third partition electrodes 170 and 1050.

The interference of the bias electrodes between the two Mach-Zehnder interferometers may be reduced by the second partition electrode 1040. Furthermore, the interference of the bias electrodes between the Mach-Zehnder interferometers and the sub-Mach-Zehnder interferometers may be reduced by the fourth partition electrode 1060. In the structure in which three optical modulators or more are provided on a substrate 101, as well, the modulation accuracy may be increased by providing partition electrodes so as to separate the bias electrodes among optical modulators.

Figure 11:
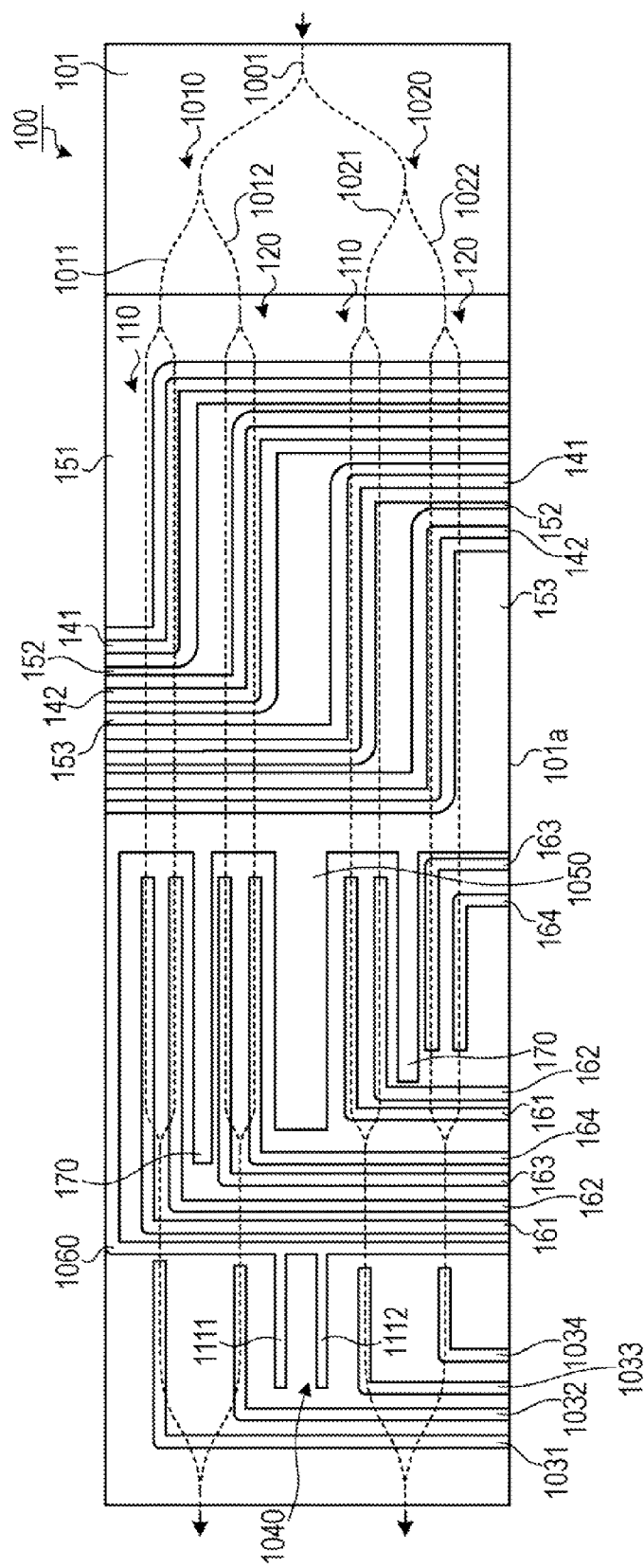
FIG. 11 is a diagram illustrating a plan view of a first modification of the optical device according to the fourth embodiment.

FIG. 11 is a plan view of a first modification of the optical device according to the fourth embodiment. In FIG. 11, the same parts as in FIG. 10 are designated by the same reference numerals, and the same description will be omitted. As illustrated in FIG. 11, the partition electrode 1040 separating the bias electrodes between the Mach-Zehnder interferometers 1010 and 1020 may include a plurality of parallel conductors respectively disposed close to the bias electrodes 1031 and 1032 of the first Mach-Zehnder interferometer 1010 and the bias electrodes 1033 and 1034 of the second Mach-Zehnder interferometer 1020.

More specifically, the partition electrode 1040 includes a conductor 1111 along the bias electrode 1032 and a conductor 1112 along the bias electrode 1033. The conductors 1111 and 1112 are formed so as to be connected to the partition electrode 1060 separating the bias electrodes between the Mach-Zehnder interferometers and the Mach-Zehnder optical modulators by patterning. This structure prevents the fluctuation in bias of the Mach-Zehnder interferometers 1010 and 1020, which is caused by a stress produced by the difference in thermal expansion between the partition electrode 1040 and the substrate 101.

Figure 12:
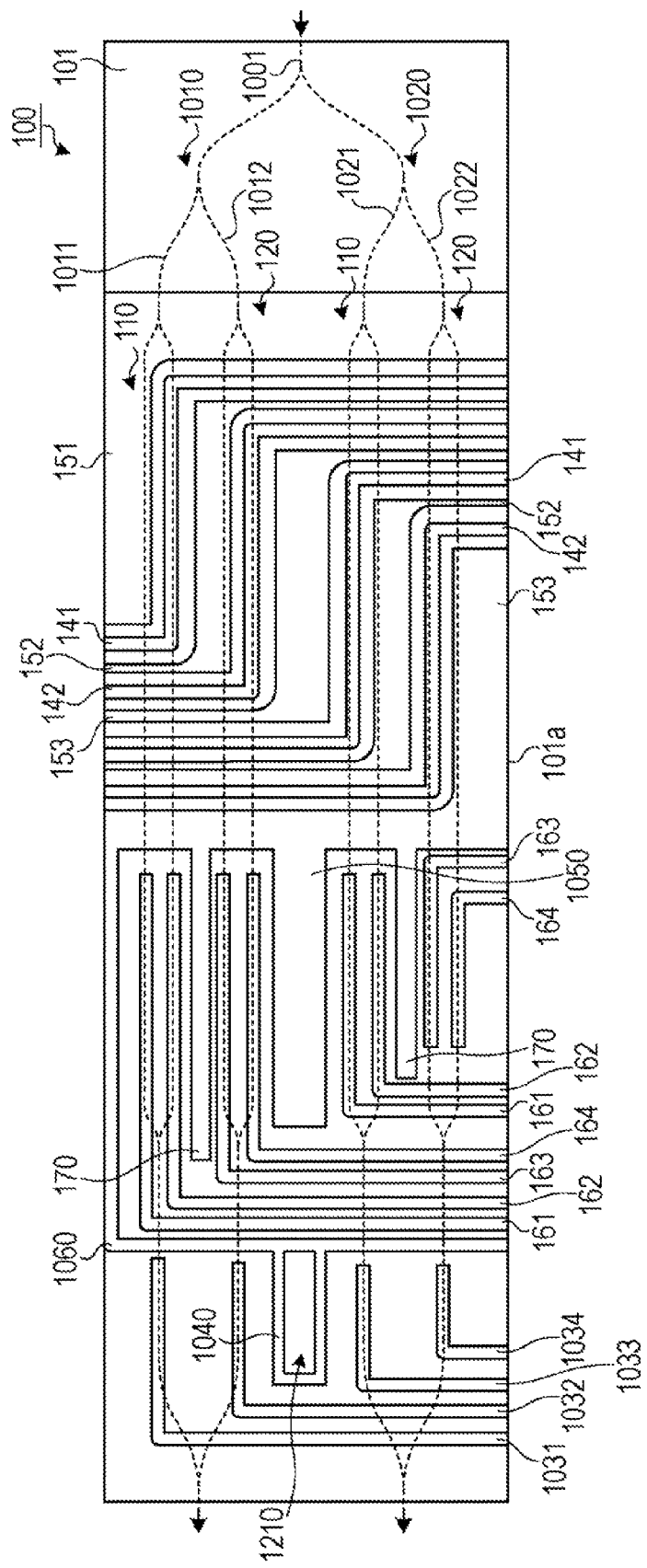
FIG. 12 is a diagram illustrating a plan view of a second modification of the optical device according to the fourth embodiment.

FIG. 12 is a plan view of a second modification of the optical device according to the fourth embodiment. In FIG. 12, the same parts as in FIG. 10 are designated by the same reference numerals, and the same description will be omitted. As illustrated in FIG. 12, the partition electrode 1040 separating the bias electrodes between the Mach-Zehnder interferometers 1010 and 1020 may have a hole 1210. This structure prevents the fluctuation in bias of the Mach-Zehnder interferometers 1010 and 1020, which is caused by a stress produced by the difference in thermal expansion between the partition electrode 1040 and the substrate 101.

According to the optical device 100 of the fourth embodiment, the same effect as in the first embodiment may be produced by providing partition electrodes so as to separating the bias electrodes among optical modulators, even if three optical modulators or more are provided to a substrate 101.

Optical Device Used in Optical Modulation Unit

Figure 13:
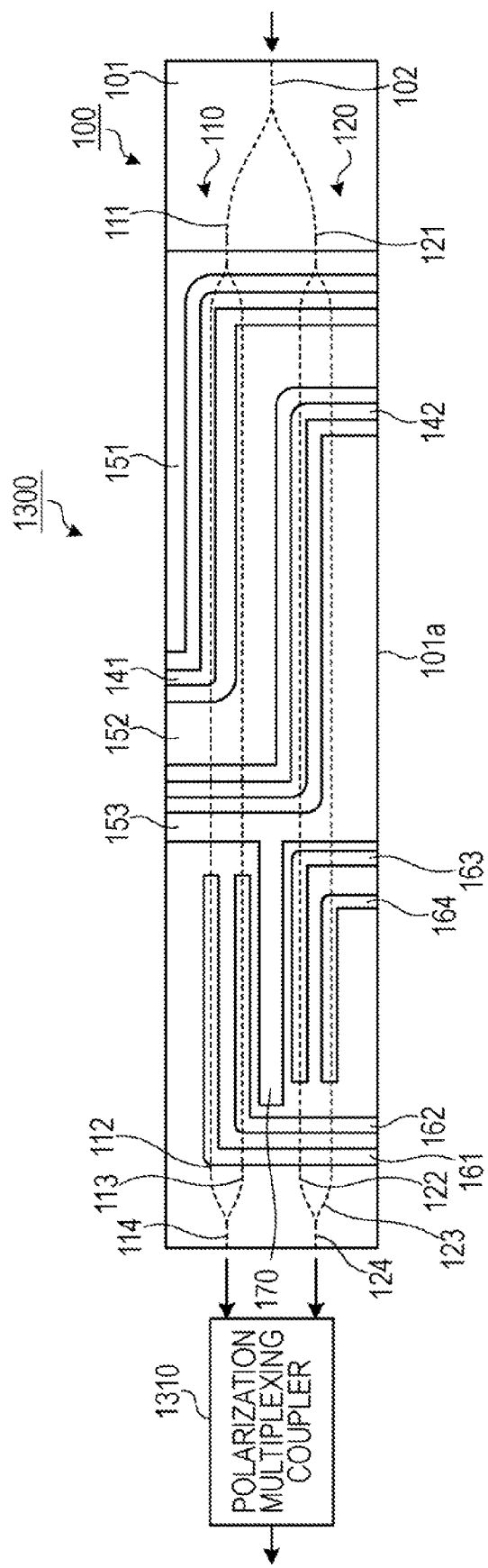
FIG. 13 is a diagram illustrating a plan view of the structure of an optical device used in an optical modulation unit.

FIG. 13 is a plan view of the structure of an optical device used in an optical modulation unit. The optical unit 1300 illustrated in FIG. 13 includes an optical device 100 and a polarization multiplexing coupler 1310 (polarization multiplexing portion). The optical device 100 may be that illustrated in FIG. 5. Other optical devices according to the above embodiments may be used in the optical unit 1300 without being limited to the optical device 100 illustrated in FIG. 5.

For example, continuous light enters the branched optical waveguide 102 of the optical device 100. The polarization multiplexing coupler 1310 polarization-multiplexes signal light from the emission side waveguides 114 and 124 of the optical device 100. Thus, optical signals accurately modulated by the optical device 100 are polarization-multiplexed to produce highly accurate polarization multiplexed signals.

Figure 14:
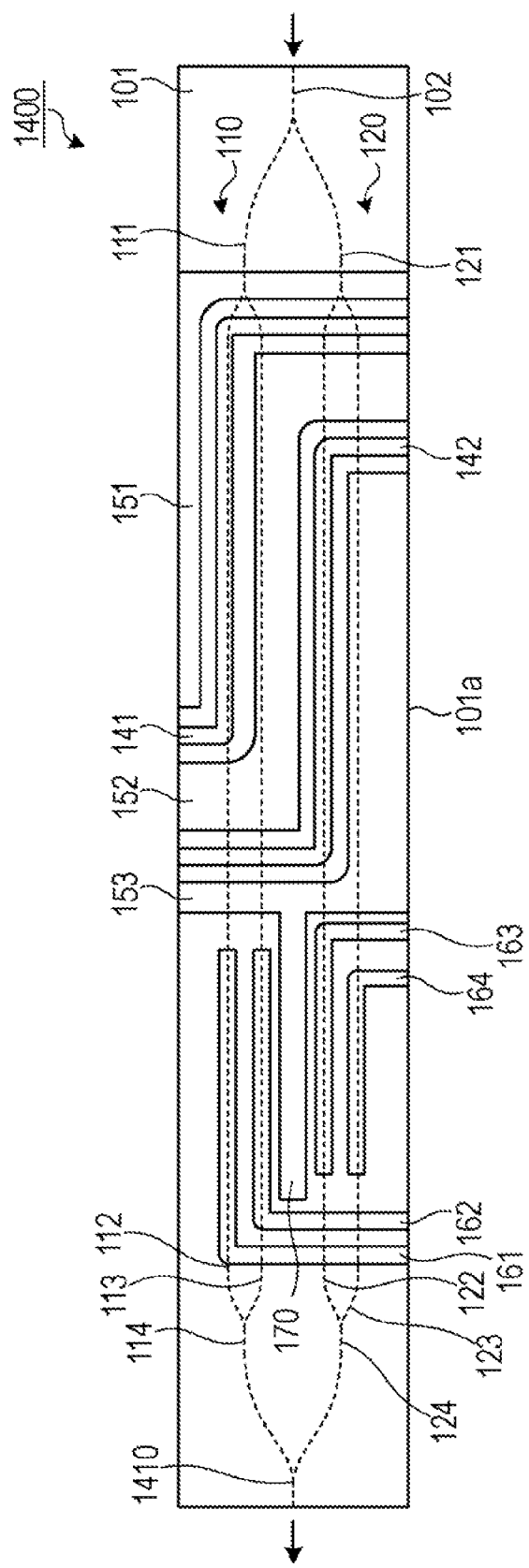
FIG. 14 is a diagram illustrating a plan view of another structure of an optical device used in an optical modulation unit.

FIG. 14 is a plan view of another optical unit including an optical device. In FIG. 14, the same parts as in FIG. 5 are designated by the same reference numerals, and the same description will be omitted. As illustrated in FIG. 14, the optical unit 1400 includes the optical device 100 illustrated in FIG. 5 and a multiplexing optical waveguide 1410 (multiplexing portion) for quadrature phase shift keying (QPSK). Other optical devices according to the above embodiments may be used in the optical unit 1400 without being limited to the optical device 100 illustrated in FIG. 5.

For example, continuous light enters the branched optical waveguide 102 of the optical device 100. The multiplexing optical waveguide 1410 multiplexes signal light from the emission side waveguides 114 and 124 and emit the multiplexed light. Thus highly accurate QPSK optical signals may be produced.

Optical Transmitter Including Optical Device

Figure 15:
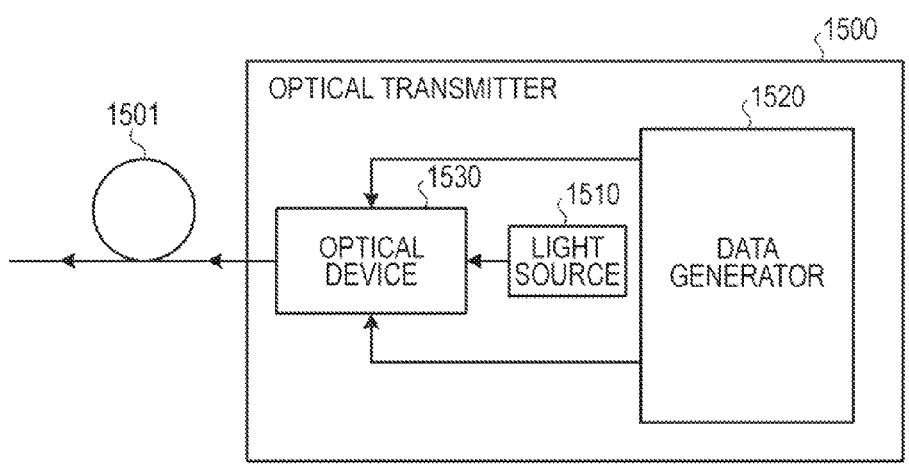
FIG. 15 is a diagram illustrating a plan view of an optical transmitter including an optical device.

FIG. 15 is a plan view of an optical transmitter including an optical device. As illustrated in FIG. 15, the optical transmitter 1500 includes a light source 1510, a data generator 1520 and an optical device 1530. The light source 1510 generates continuous light and outputs the light to the optical device 1530. The data generator 1520 generates data signals to be applied to the optical modulators of the optical device 1530 and outputs the data signals to the optical device 1530.

The optical device 1530 may be the optical device 100 according to any one of the above-described embodiments. If, for example, the optical device 100 illustrated in FIG. 1 is used as the optical device 1530, the continuous light from the light source 1510 enters the branched optical waveguide 102. The date signals from the data generator 1520 are applied to the signal electrodes 141 and 142.

While the optical transmitter 1500 includes a light source 1510 in the present embodiment, an external light source may be used for the optical transmitter 1500. The light entering the optical device 1530 is not limited to continuous light and may be return-to-zero (RZ) pulsed signal light. The light signal output from the optical device 1530 is transmitted to an optical receiver through an optical fiber 1501. The optical transmitter 1500 transmits light signals accurately modulated by the optical device 1530 according to data signals from the data generator 1520.

Shape of Partition Electrode

The partition electrode 170 of the optical device according to the above-described embodiments may be made of the same material as the bias electrodes 161 to 164. Thus, the bias electrodes 161 to 164 and the partition electrode 170 are formed in the same process for forming electrodes. Furthermore, the partition electrode 170 is formed to the same thickness as the bias electrodes 161 to 164. Thus, the bias electrodes 161 to 164 and the partition electrode 170 are formed in one process.

The partition electrode 170 of the optical device according to the above embodiments may have a smaller thickness as the bias electrodes 161 to 164. This structure prevents the fluctuation in bias of the Mach-Zehnder optical modulators 110 and 120, which is caused by a stress produced by the difference in thermal expansion between the partition electrode 170 and the substrate 101.

The bias electrodes 161 to 164 may each have a multilayer structure, and the layer of the bias electrodes 161 to 164 closest to the substrate 101 (the lowermost layer of the bias electrodes) may have the same thickness as the partition electrode 170. The lowermost layer of the bias electrodes 161 to 164 is formed in the same process as the process for forming the partition electrode 170, and the thickness of the partition electrode 170 may be smaller than that of the bias electrodes 161 to 164.

Use of X-Cut Substrate

Although the optical device according to the above embodiments uses a Z-cut substrate as the substrate 101, an X-cut substrate may be used.

Figure 16:
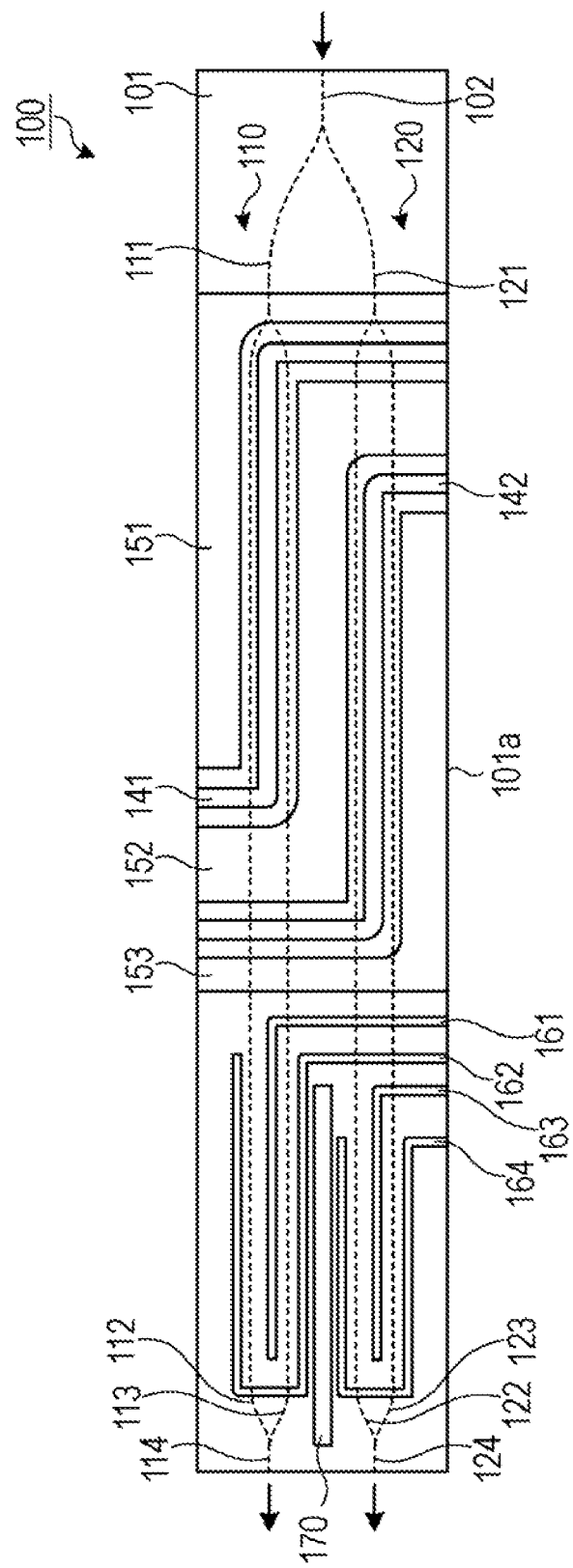
FIG. 16 is a diagram illustrating a plan view of a modification of the optical device illustrated in FIG. 1.

FIG. 16 is a plan view of a modification of the optical device illustrated in FIG. 1. In FIG. 16, the same parts as in FIG. 1 are designated by the same reference numeral, and the same description will be omitted. FIG. 16 illustrates an optical device 100 using an X-cut substrate as the substrate 101.

In this instance, the direction of the electric field applied to the parallel waveguides 112, 113, 122 and 123 by the signal electrodes 141 and 142 is parallel to the surface of the substrate 101. Accordingly, it is preferable that the parallel waveguides 112 and 113 be located not under the signal electrode 141, but between the signal electrode 141 and the ground electrodes 151 and 152. Similarly, it is preferable that the parallel waveguides 122 and 123 be located not under the signal electrode 142, but between the signal electrode 142 and the ground electrodes 152 and 153.

If an X-cut substrate is used as the substrate 101, as well, the bias electrodes 161 to 164 control DC bias. In this instance, the parallel waveguides 112 and 113 of the first optical modulator 110 are disposed between the bias electrodes 161 and 162. Similarly, the parallel waveguides 122 and 123 of the second optical modulator 120 are disposed between the bias electrodes 163 and 164.

As described above, in use of an X-cut substrate as well, the same effect as the optical device 100 illustrated in FIG. 1 is produced. The structure using an X-cut substrate may be applied to the optical devices 100 according to the above-described embodiments without being limited to the optical device 100 illustrated in FIG. 1.

As described above, the optical device and the optical transmitter according to the disclosed embodiments may increase the accuracy in modulating optical signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical device comprising:
   a substrate having an electro-optical effect;
   a plurality of optical modulators including bias electrodes to which a bias voltage is applied so as to generate an electric field from one of the bias electrodes to another of the bias electrodes, and the bias electrodes of the optical modulators being disposed above the substrate; and
   a partition conductor to reduce influence of the electric field from the one of bias electrode of a first optical modulator to an optical waveguide of a second optical modulator, the partition conductor being disposed above the substrate.

2. The optical device according to claim 1, wherein the partition conductor is disposed between the bias electrode of the first and second optical modulators.

3. The optical device according to claim 1, wherein the partition conductor is a partition electrode disposed above the substrate.

4. The optical device according to claim 1, wherein each of the optical modulators is a Mach-Zehnder optical modulator that includes a signal electrode to apply signals to parallel waveguides and the bias electrodes to apply the bias voltage to the parallel waveguides.

5. The optical device according to claim 1, wherein the bias electrodes include a push electrode and a pull electrode.

6. The optical device according to claim 1, further comprising:
an enclosure to contain the substrate, having electrodes extending from an inside of the enclosure to an outside thereof;
wherein the partition conductor is electrically connected with the electrodes in the inside thereof.

7. The optical device according to claim 1, wherein the optical modulator has a ground electrode for a signal electrode on the substrate, the partition conductor is electrically connected with the ground electrode.

8. The optical device according to claim 7, wherein the partition conductor is electrically connected with the ground electrode by wire bonding.

9. The optical device according to claim 7, wherein the partition conductor is electrically connected with the ground electrode by patterning on the substrate.

10. The optical device according to claim 9, wherein an end of both ends of each bias electrode of the plurality of optical modulators reaches a side of the substrate.

11. The optical device according to claim 1, wherein a plurality of electrode pads are provided along a side of the substrate, the plurality of electrode pads being connected to the bias electrodes of the plurality of optical devices with feed parts, and the partition conductor extends to the feed part located between the feed parts of the plurality of optical devices.

12. The optical device according to claim 11, wherein the partition conductor extends between the electrode pads of the plurality of optical devices.

13. The optical device according to claim 12, wherein a partition electrode pad connected to the partition conductor is provided along the side of the substrate.

14. The optical device according to claim 13, wherein the partition electrode pad and the plurality of electrode pads aligns at substantially regular intervals.

15. The optical device according to claim 5, wherein a distance between the bias electrode and the partition electrode is larger than a distance between the push electrode and the pull electrode.

16. The optical device according to claim 1, wherein a width of the partition conductor is larger than the width of the bias electrode.

17. The optical device according to claim 1, further comprising:
a plurality of interferometers including the plurality of optical modulators, the partition conductor, and a second bias electrode to which the electric field is generated for each optical waveguide on the substrate; and
a second partition conductor to reduce influence of the electric field generated by the second bias electrode on the optical waveguide of another interferometer.

18. The optical device according to claim 17, further comprising:
a third partition conductor by which the bias electrode of the plurality of optical devices and the second bias electrode of the plurality of the interferometers are separated, the third partition connecting the partition conductor with the second partition conductor.

19. The optical device according to claim 1, wherein the partition conductor includes a plurality of conductors respectively disposed close to each of the bias electrodes of the plurality of optical modulators.

20. An optical transmitter including the optical device according to claim 1, the optical transmitter comprising:
a data generator to generate data signals to be applied to the optical modulators.

* * * * *